May 29, 1934.   G. J. FOLEY   1,960,437
LINING FOR RUBBER AND METHOD OF MAKING THE SAME
Filed July 24, 1930
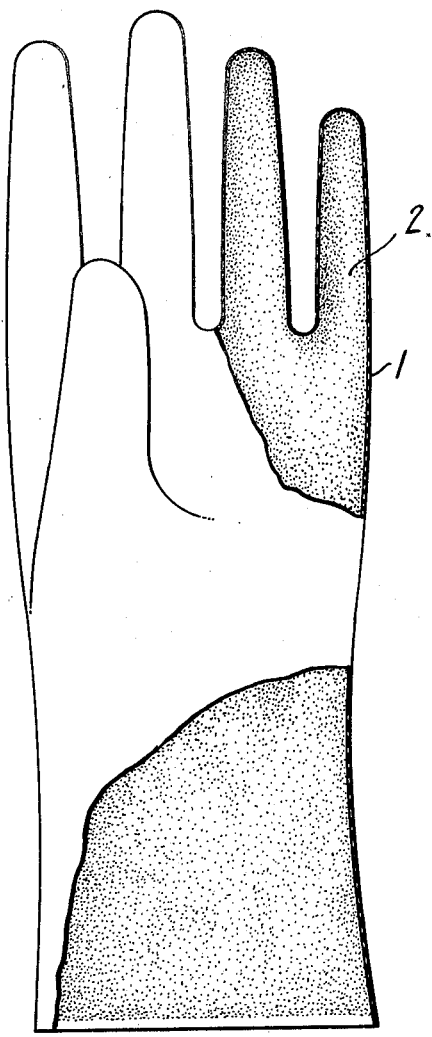
INVENTOR
George J. Foley
BY
ATTORNEY Patented May 29, 1934

1,960,437

UNITED STATES PATENT OFFICE 1,960,437

LINING FOR RUBBER AND METHOD OF MAKING THE SAME

George J. Foley, Naugatuck, Conn., assignor to The Naugatuck Chemical Company, Naugatuck, Conn., a corporation of Connecticut Application July 24, 1930, Serial No. 470,445

7 Claims. (Cl. 18—58)

My invention relates to linings for rubber and methods of making the same, and more particularly to linings for elastic rubber gloves and methods of making the same.

In articles of wearing apparel composed of rubber and/or rubber composition it is desired to obtain considerable elasticity of the articles. Such elasticity is interferred with by the presence of the ordinary fabric lining which is cemented or otherwise secured to one of the faces of the rubber article. However, the presence of an inner lining in such articles is desirable in order to facilitate the donning and removal of the articles from the extremities of the wearer. The presence of a lining permits the existence of an air film along the inner surfaces of the article. The air film eliminates the difficulty experienced in drawing plain rubber surfaces over articles of wearing apparel and/or the epidermis of the wearer. The presence of air film also eliminates some of the heating experienced with unlined rubber articles.

In the case of highly elastic rubber gloves, such as surgeons' gloves and gloves for electrical workers, it is necessary to preserve the high elasticity of the rubber to insure a close fitting of the gloves to the hands of the wearer. At the same time it is desirable to have a lining for the reasons already discussed. In the case of gloves the presence of a lining also eliminates the "clammy" feeling which is characteristic of unlined gloves.

I provide a fiber lining for gloves in which small particles of comminuted fiber, such as silk, wool or cotton flock, are secured to the inner surface of a rubber glove by an adhesive which does not materially impair the elasticity of the glove when the latter is cured. In applying the lining the comminuted fibrous material is secured to a form by an adhesive. The form is then alternately dipped in a latex and coagulating solution until the desired body of rubber is deposited on the form and over the flock lining. The rubber is then cured with the lining on the inner surface of the glove.

The accompanying drawing illustrates a broken sectional view of a glove made according to my invention.

Referring to the drawing a glove 1 of rubber or rubber composition is provided with a lining 2 of comminuted material, such as silk, cotton or wool flock, or finely ground leather or paper, secured to the rubber and without substantially decreasing the elasticity of the body 1. The presence of the lining 2 facilitates the donning and removal of the glove as an air film is formed between the lining and the extremity of the wearer. The presence of the lining also prevents the clammy feel which is characteristic of rubber directly engaging the epidermis of a wearer. While many kinds of comminuted material may be suitable for various purposes, I prefer a comminuted cotton fiber for such articles as gloves as it is softer than wool and other types of fiber.

In making such a glove, a form, preferably a baked porcelain form, is coated with an adhesive. A suitable adhesive is pine tar at 200° F. applied to a heated form at substantially the same temperature. The adhesive is applied by dipping the form into a quantity of the adhesive, removing the form, draining excessive adhesive from the form and then cooling the form. By rotating the form during the cooling period an even distribution of the coating is obtained. Alternatively, the pin tar may be thinned with a solvent. In the case of pine tar a relatively thin film is sufficient so that the total quantity of pine tar carried by the form is relatively small.

Flock may be dusted onto the coated form by means of a screen or sifting device. Excess flock is removed from the form by shaking it so that all of the flock remaining on the form is securely held by the adhesive. To remove occluded air, the form and adhering flock are dipped in cold water, or in a coagulant. After draining slightly to remove excess liquid, the form is dipped directly into a latex bath. The latex composition may vary in accordance with the desired composition of the finished article.

The coated form may then, if necessary, be dipped into a coagulant, such as an acetic acid-alcohol bath to coagulate the rubber. The dipping operations may be repeated, if the necessary thickness of rubber film is not attained in one dip. After the desired film has been built up, the form and adhering rubber composition are dried for approximately one hour at 180° F. to remove excess moisture. The article on the form is then cured as convenient, for instance, in water under forty pounds steam pressure. The glove or other article is then stripped from the form.

The quantity of adhesive originally applied to the form is small and is absorbed by the rubber during the curing operation without any material deleterious effect upon the rubber. During the vulcanization of the rubber the flock is embedded in and united to the inner surface of the glove.

It is to be understood that other types of adhesive not deleterious to rubber may be used instead of pine tar. Also the lengths and temperatures of the drying and curing steps may be varied as desired. Also, it is to be understood that the lining may be applied to a variety of articles, other than gloves, by the method herein described.

While I have shown and described the present preferred embodiment of the invention and method of practicing it, it is to be understood that the invention may be otherwise embodied and practiced within the spirit of the invention and scope of the appended claims.

Having thus described my invention, what I claim and desire to protect by Letters Patent is:

1. In the method of making a rubber body provided with a surfacing of minute separate particles of fiber, the steps comprising covering a form with an adhesive absorbable in rubber, applying minute particles of fiber to the adhesive, and applying rubber composition to the fiber on the form and permanently uniting the rubber and fiber by vulcanization.

2. In the method of making a rubber body provided with a surfacing of minute separate particles of fiber, the steps comprising covering a form with adhesive, dusting minute particles of fiber onto the adhesive, applying rubber composition to the form over the fiber, withdrawing adhesive from the fiber particles and permanently uniting the particles to the rubber by vulcanization.

3. In the method of making a rubber body provided with a lining material in a finely comminuted form, the steps comprising covering a form with an adhesive absorbable in rubber, applying comminuted material to the form, then covering the material with a rubber composition by immersing the form in a latex composition, and absorbing the adhesive in the rubber.

4. In the method of making a rubber body provided with a lining material in a finely comminuted form, the steps comprising covering a form with an adhesive absorbable in rubber, applying comminuted material to the form, then covering the material with a rubber composition by immersing the form in a latex composition, and curing the adhering composition.

5. In the method of making a rubber body provided with a lining material in a finely comminuted form, the steps comprising covering a form with an adhesive absorbable in rubber, applying comminuted material to the form, removing occluded air from the adhering material, and then applying a rubber composition to the form and material by immersing in a latex bath and subsequently curing the adhering latex.

6. In the method of making a glove with a lining material in a finely comminuted form, the steps comprising covering a form with an adhesive capable of absorption in rubber, applying comminuted material to the form, removing occluded air from the adhering material, and then applying a rubber composition to the form and material by immersing in a latex bath and subsequently curing the deposited rubber and absorbing the adhesive thereinto.

7. In the method of making a rubber body with a lining of minute particles of material, the steps comprising securing particles of material to a form by pine tar, removing occluded air from the material, depositing rubber on the form by immersing the form in a bath of latex composition, and absorbing the pine tar into the rubber.

GEORGE J. FOLEY.